(12) United States Patent
Muggenthaler (10) Patent No.: US 8,836,320 B2
(45) Date of Patent: Sep. 16, 2014

(54) APPARATUS FOR DECOUPLING A RADIO-FREQUENCY SIGNAL TRANSMITTED ON A DATA TRANSMISSION LINE

(75) Inventor: Peter Muggenthaler, Modautal (DE)

(73) Assignee: Deutsche Telekom AG, Bonn (DE)

(*) Notice: Subject to any disclaimer, the term of this patent is extended or adjusted under 35 U.S.C. 154(b) by 0 days.

(21) Appl. No.: 13/637,475

(22) PCT Filed: Mar. 22, 2011

(86) PCT No.: PCT/EP2011/001407
§ 371 (c)(1),
(2), (4) Date: Dec. 7, 2012

(87) PCT Pub. No.: WO2011/116928
PCT Pub. Date: Sep. 29, 2011

(65) Prior Publication Data
US 2013/0077667 A1 Mar. 28, 2013

(30) Foreign Application Priority Data

Mar. 26, 2010 (EP) .................................... 10003252
Aug. 19, 2010 (EP) .................................... 10008666

(51) Int. Cl.
*G01R 15/18* (2006.01)
*H04M 3/22* (2006.01)
*H04B 3/46* (2006.01)
*H04M 3/30* (2006.01)

(52) U.S. Cl.
CPC ............... *H04B 3/46* (2013.01); *H04M 3/2209* (2013.01); *H04M 2203/056* (2013.01); *H04M 3/30* (2013.01)
USPC ............. 324/127; 324/126; 333/32; 333/17.3

(58) Field of Classification Search
USPC .................................. 370/289, 247; 379/1.03
See application file for complete search history.

(56) References Cited

U.S. PATENT DOCUMENTS

| | | | |
|---|---|---|---|
| 5,504,736 A * | 4/1996 | Cubbison, Jr. ................. 370/241 |
| 6,624,721 B1 * | 9/2003 | Hagen et al. ................... 333/112 |
| 6,813,340 B1 * | 11/2004 | Issaa et al. ...................... 379/31 |
| 7,130,922 B1 * | 10/2006 | Barrow .......................... 709/245 |
| 7,929,987 B2 * | 4/2011 | Lee et al. .................... 455/550.1 |
| 8,098,114 B2 * | 1/2012 | Fukuda et al. .................. 333/32 |
| 2008/0309349 A1 * | 12/2008 | Sutono ........................... 324/537 |
| 2009/0179711 A1 * | 7/2009 | Fukuda et al. .................. 333/32 |

* cited by examiner

*Primary Examiner* — Richard Isla Rodas
(74) *Attorney, Agent, or Firm* — Leydig, Voit & Mayer, Ltd.

(57) ABSTRACT

An apparatus for decoupling a radio-frequency signal transmitted on a data transmission line having a first line element and a second line element, or for decoupling interference voltages includes: a tapping module, connected to the first and second line elements at a first tapping location of the data transmission line, for decoupling the radio-frequency signal or interference voltages; a current probe module, coupled to the first line element at a second tapping location of the data transmission line; and an output capable of being matched to different input impedances of a device connected to the output.

15 Claims, 3 Drawing Sheets

APPARATUS FOR DECOUPLING A RADIO-FREQUENCY SIGNAL TRANSMITTED ON A DATA TRANSMISSION LINE

CROSS-REFERENCE TO RELATED APPLICATIONS

This patent application is a national stage entry under 35 U.S.C. §371 of International Application No. PCT/EP2011/001407, filed Mar. 22, 2011, and claims priority to European Patent Application No. EP 10003252.3, filed Mar. 26, 2010, and European Patent Application No. EP 10008666.9, filed Aug. 19, 2010. The International Application was published in German on Sep. 29, 2011 as WO 2011/116928.

FIELD

The present invention relates to an apparatus for decoupling a radio-frequency signal transmitted on a data transmission line or for decoupling interference voltages, in particular for the purpose of carrying out a measurement on the permanently installed data transmission line.

BACKGROUND

Data transmission lines are installed in their millions nowadays, for example for the purpose of supplying private households or companies with comparatively broadband data connections. By way of example, currently approximately 20 million DSL connections (Digital Subscriber Line connections), in particular ADSL connections (Asymmetric Digital Subscriber Line connections) or VDSL connections (Very High Bitrate Digital Subscriber Line connections), are currently set up in the copper conductor pair network of Deutsche Telekom AG in Germany. Depending on the operating state and configuration of these systems, the power spectral densities (so-called PSD spectra, Power Spectral Density spectra) that can be measured on individual data transmission lines of such data transmission systems can deviate considerably from the power spectral density striven for.

Hitherto, the measurement of individual data transmission lines of such data transmission systems has been able to be realized only with various disadvantages being accepted. Said disadvantages include, inter alia, comparatively low measurement accuracy particularly when measuring the power spectral density, and often the necessity that, for carrying out the measurement of a predefined data transmission line, the latter has to be isolated, i.e. interrupted.

SUMMARY

In an embodiment, the present invention provides an apparatus for decoupling a radio-frequency signal transmitted on a data transmission line having a first line element and a second line element, or for decoupling interference voltages. The apparatus includes: a tapping module, connected to the first and second line elements at a first tapping location of the data transmission line, for decoupling the radio-frequency signal or interference voltages; a current probe module, coupled to the first line element at a second tapping location of the data transmission line; and an output capable of being matched to different input impedances of a device connected to the output.

DETAILED DESCRIPTION

In an embodiment, the present invention provides an apparatus for decoupling a radio-frequency signal transmitted on a data transmission line or for decoupling interference voltages, which avoids or at least reduces the disadvantages of the prior art and which is constructed and can be produced simply and cost-effectively and can be used in a simple and efficient manner in practical testing.

In an embodiment, the present invention provides an apparatus for decoupling a radio-frequency signal transmitted on a data transmission line having a first line element and a second line element, wherein the apparatus comprises a tapping module and a current probe module, wherein a connection of the tapping module to the first and second line elements at a first tapping location of the data transmission line is provided for the purpose of decoupling the radio-frequency signal, and wherein a coupling of the current probe module to the first line element at a second tapping location of the data transmission line is provided for the purpose of decoupling the radio-frequency signal. In a further embodiment, the present invention provides an apparatus for decoupling a radio-frequency signal transmitted on a data transmission line (50) having a first line element (51) and a second line element (52), or for decoupling interference voltages, wherein the apparatus (10) comprises a tapping module (20) and a current probe module (30), wherein a connection of the tapping module (20) to the first and second line elements (51, 52) at a first tapping location (61) of the data transmission line (50) is provided for the purpose of decoupling the radio-frequency signal and interference voltages, and wherein a coupling of the current probe module (30) to the first line element (51) at a second tapping location (62) of the data transmission line (50) is provided in the case of decoupling the radio-frequency signal, and a coupling of the current probe module (30) to the first and second line elements (51, 52) at a second tapping location (62) of the data transmission line (50) is provided in the case of decoupling the interference voltages.

The apparatus according to the invention has the advantage that, in contrast to a customary directional coupler of closed design, an uninterruptable measurement of the data transmission line is possible. This firstly has the advantage that, for carrying out the measurement, the data transmission line to be measured does not have to be interrupted and subsequently reconnected, such that a different (matching) configuration (not measured) possibly results after the measurement has been carried out. Furthermore, this has the advantage that the measure of interruption and reconnection is not required, such that the measurement first of all takes place more accurately (because error sources occurring after the measurement, caused for instance by the reconnection, are avoided) and secondly is simpler, faster and possible with less expenditure of work time. According to the invention, the apparatus can be used both for measuring a radio-frequency signal and for measuring interference voltages (or irregular interference signals) on the data transmission line. In this case, the apparatus is operated in a so-called differential mode for the purpose of decoupling the radio-frequency signal and in a so-called common mode for the purpose of decoupling the interference voltages. The two operating modes or tapping modes substantially differ only in the different handling or the different tapping. The radio-frequency signals (i.e. the useful signals, for example xDSL signals, to be transmitted on the data transmission line generate, on the data transmission line embodied as a conductor pair, a differential-mode voltage or differential voltage between the first line element and the second line element. For the measurement of these radio-frequency signals, the apparatus according to the invention is used in differential-mode operation. With the aid of this measurement, the xDSL transmission power coupled into a cable is primarily intended to be measured as exactly as possible. In one preferred embodiment, on account of the directional coupler effect, the signal direction of the xDSL signal can be determined with the aid of a switch. On account of diverse causes, undesirable interference voltages are also coupled via various interference paths into telecommunication cables generally as common mode. The interference voltage is then between the data transmission line (generally a conductor pair or a copper conductor pair) and ground or the cable sheath. The interference potential on both line elements with respect to ground of the data transmission line is thus identical; for the common mode, the data transmission line can be imagined as a single line (or the two line elements as a single line). Common-mode operation is used for the measurement of these interference variables or interference voltages. In the preferred embodiment with a switch, the fundamentally unknown signal direction of the interference signal is primarily intended to be determined in order to localize the interference transmitter. Although the apparatus in common-mode operation, too, can ensure measurement accuracies similar in magnitude to those in differential-mode operation, the absolute measurement accuracy does not play a crucial part in locating the interference source.

The apparatus according to the invention is used as a directional coupler and is connected to the data transmission line for the purpose of decoupling the radio-frequency signal transmitted on the generally permanently installed data transmission line, or for the purpose of decoupling interference voltages, in which case, however, no change whatsoever is made to the predefined configuration of the installation of the data transmission owing to the measurement being carried out. For this purpose, the apparatus according to the invention comprises two modules or measuring modules, which are preferably coordinated with one another and together realize the decoupling of the radio-frequency signal transmitted on the signal transmission line to be measured. The present invention is illustrated primarily on the basis of the example of decoupling a radio-frequency signal or interference voltages on a data transmission line having a first line element and a second line element, in particular taking as a basis the example of a copper wire pair (copper conductor pair) as the data transmission line. However, the invention can also be applied to other types of data transmission line, for example comprising more than two line elements and/or comprising other line materials.

The two modules or measuring modules in the apparatus according to the invention are a tapping module and a current probe module. The tapping module serves for tapping, i.e. voltage tapping, in the case of decoupling the radio-frequency signal (differential-mode operation) between the first line element and the second line element of the data transmission line and in the case of decoupling the interference voltages (common-mode operation) between the line elements of the data transmission line, on the one hand, and ground, on the other hand. This tapping is effected at a first tapping location along the extent of the data transmission line. The current probe module serves for coupling at a second tapping location along the extent of the data transmission line, to be precise by coupling the current probe module to the first line element of the data transmission line in the case of decoupling the radio-frequency signal, and by coupling the current probe module to the first and second line elements of the data transmission line in the case of decoupling interference voltages.

The apparatus serves, in particular, for carrying out measurements of the power spectral density of the data transmission line or carrying out measurements for locating interference sources. In this case, it is provided, in particular, that a further device for fully carrying out such a measurement is connected to an output of the apparatus according to the invention. In particular, a so-called spectrum analyzer, which first performs the actual measurement of the power spectral density, is appropriate as such a further device. However, the apparatus according to the invention makes the measurement signal available to such a spectrum analyzer, i.e. the measurement accuracy of the measurement carried out is sensitively dependent on the apparatus according to the invention, which, in the case of such a measurement set-up, serves as a measuring head for the spectrum analyzer and is therefore also designated hereinafter as applied power measuring head.

According to the invention, it is preferred for the current probe module to have a split toroidal core magnet. It is thereby possible in an advantageous manner to perform a particularly simple and accurate measurement of the current flow through the first line element of the data transmission line.

According to the invention, it is furthermore also preferred that in the case of decoupling the interference voltages, a coupling of the current probe module (30) to the first and second line elements (51, 52) is provided in such a way that the current probe module (30) embraces the first and second line elements (51, 52) in the same sense.

It is thereby advantageously possible according to the invention to perform a simple measurement of the interference voltages by means of a simple tapping or by means of a simple coupling of the current probe module to the first and second line elements.

According to the invention, it is furthermore preferred for the tapping module to be embodied as a sensing head having a first tapping element and a second tapping element. It is thereby possible in an advantageous manner for the measurement to be effected rapidly and simply.

It is furthermore preferred if the apparatus is configured in such a way that the first and second tapping locations are at a distance from one another of 2 cm to 200 cm, preferably of 5 cm to 50 cm, particularly preferably of 8 cm to 15 cm, especially preferably 10 cm. This distance between the first tapping location and the second tapping location refers, in particular, to the distance between the tapping locations along the extent of the data transmission line.

According to the invention, it is furthermore also preferred for the apparatus to comprise a changeover switch, wherein the changeover switch effects a circuitry interchange of the tapping elements of the tapping module. This means that in the case of an electrically conductive connection of the first tapping element (of the tapping module) to the first line element and an electrically conductive connection of the second tapping element to the second line element (in the case of decoupling the radio-frequency signal, i.e. operation of the apparatus in differential-mode operation), a switch-over of the changeover switch brings about a connection configuration of the apparatus to the line elements of the data transmission line in such a manner as if the first tapping element had an electrically conductive connection to the second line element and the second tapping element had an electrically conductive connection to the first line element. Correspondingly, in the case of an electrically conductive connection of the first tapping element (of the tapping module) to the first and second line elements and an electrically conductive connection of the second tapping element to ground (of the data transmission line) (in the case of decoupling interference voltages, i.e. operation of the apparatus in common-mode operation), a switch-over of the changeover switch brings about a connection configuration of the apparatus to the line elements of the data transmission line in such a manner as if the first tapping element had an electrically conductive connection to ground and the second tapping element had an electrically conductive connection to the first and second line elements. As a result, in both cases or both operating modes, according to the invention firstly it is possible particularly simply and rapidly to perform a good coordination or matching of the apparatus to the impedance relations of the data transmission line to be measured, and secondly it is thereby possible, when carrying out the measurement, to minimize the outlay to the effect that it is not necessary to make a change to the tapping of the tapping module on the data transmission line or a change in the coupling of the current probe module on account of incorrect polarity, rather it is merely necessary to operate the changeover switch. This accelerates the performance of the measurement and furthermore improves the measurement accuracy, since with the same tapping configuration (i.e. with the possibility of good matching to the impedance relations) it is also possible to carry out the measurement without necessitating an interchange of the tapping on the first and second line elements.

According to the invention, it is furthermore likewise preferably provided that the apparatus has a decoupling attenuation of 40 dB+/−0.1 dB from 30 kHz to 30 MHz. It is thereby preferably possible according to the invention that a connected spectrum analyzer is not overdriven. On account of the high linearity according to the invention of the apparatus according to the invention of +/−0.1 dB in the frequency range from 30 kHz to 30 MHz at a customary copper conductor pair impedance of, for example, Z=135Ω+/−20Ω(+/−15%), only a level correction of 40 dB has to be carried out when evaluating the measurement results of the spectrum analyzer.

In accordance with a further preferred embodiment of the present invention, it is provided that the apparatus has an output, wherein the output can be matched to different input impedances of a device connected to the output. It is thereby possible in an advantageous manner to obtain a very accurate and resilient measurement result of the measurement on the data transmission line.

According to the invention, it is preferably provided, in particular, that the apparatus is operated for measurement in copper conductor pair networks (i.e. networks comprising copper wire pairs or copper conductor pairs as data transmission lines within the meaning of the present invention) with a customary average impedance of 135Ω in conjunction with commercially available and suitable (and sufficiently accurate) generally portable spectrum analyzers operated with a rechargeable battery and having a symmetrical receiver input having an input or a measurement impedance $R_m$ of approximately 100Ω to approximately 150Ω. However, the apparatus according to the invention can also be optimized or matched to frequency ranges or impedance relations other than those mentioned here merely by way of example (on the basis of the example of the typical impedance relations of the telecommunication network (primarily installed in Germany) of Deutsche Telekom)), in order to obtain the same advantages according to the invention, namely a simple, fast and at the same time comparatively highly accurate line measurement.

Further subject matter of the present invention relates to the use of an apparatus according to the invention for carrying out a measurement on a (generally permanently installed) data transmission line.

In this case, it is preferred that the data transmission line can be used uninterruptedly for the data transmission while the measurement is carried out. This is an essential advantage which makes the performance of the method not only simpler and faster, but at the same time also more accurate, since measurement is effected at the same (or unchanged) line configuration which is also used for the data transmission.

It is furthermore preferred that a copper wire pair, preferably a copper wire twisted pair, is used as the data transmission line, and/or that a spectrum analyzer for measuring the power spectral density of the radio-frequency signal transmitted on the data transmission line is connected to the apparatus, or for measuring interference voltages, and/or that the apparatus is matched to different input impedances of the spectrum analyzer.

Further subject matter of the present invention relates to a method for carrying out a measurement on a data transmission line provided for transmitting a radio-frequency signal and having a first line element and a second line element, wherein an apparatus for decoupling the radio-frequency signal comprises a tapping module and a current probe module, wherein the tapping module is connected to the first and second line elements at a first tapping location of the data transmission line for the purpose of decoupling the radio-frequency signal, and wherein the current probe module is coupled to the first line element at a second tapping location of the data transmission line for the purpose of decoupling the radio-frequency signal. Further subject matter of the present invention relates to a method for carrying out a measurement on a data transmission line (50) provided for transmitting a radio-frequency signal and having a first line element (51) and a second line element (52), wherein an apparatus (10) for decoupling the radio-frequency signal comprises a tapping module (20) and a current probe module (30), wherein the tapping module (20) is connected to the first and second line elements (51, 52) at a first tapping location (61) of the data transmission line (50) for the purpose of decoupling the radio-frequency signal, and wherein the current probe module (30) is coupled to the first line element (51) at a second tapping location (62) of the data transmission line (50) in the case of decoupling the radio-frequency signal, and the current probe module (30) is coupled to the first and second line elements (51, 52) at a second tapping location (62) of the data transmission line (50) in the case of decoupling the interference voltages.

In this case, it is preferred that a spectrum analyzer for measuring the power spectral density of the radio-frequency signal transmitted on the data transmission line is connected to the apparatus, wherein an output of the apparatus is matched to different input impedances of the spectrum analyzer.

Exemplary embodiments of the invention are illustrated in the drawing and explained in greater detail in the description below. The figures do not restrict the general concept of the invention.

Figure 1:
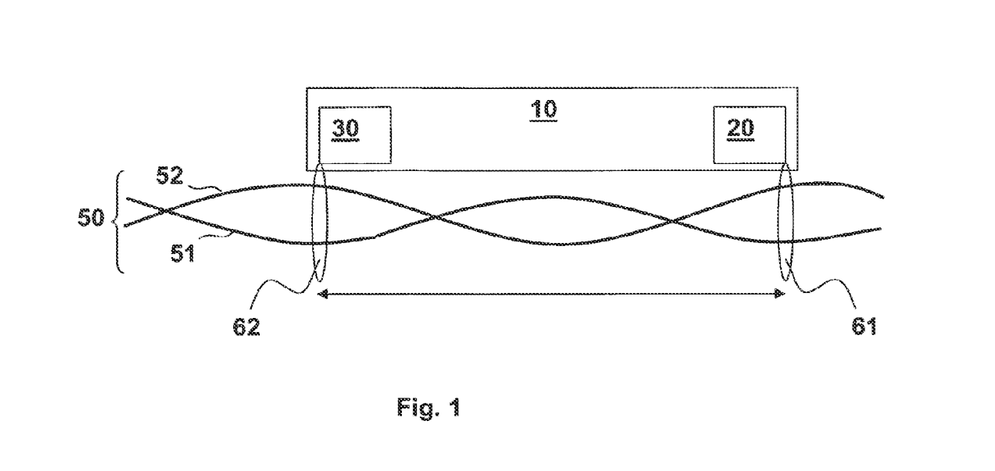
FIG. 1 shows a schematic illustration in the sense of a block diagram of an apparatus according to the invention, which is connected to a data transmission line at a first tapping location and a second tapping location for the purpose of decoupling a radio-frequency signal transmitted on the data transmission line.

FIG. 1 schematically illustrates, in the sense of a block diagram, an apparatus 10 according to the invention for decoupling a radio-frequency signal transmitted on a data transmission line 50. It goes without saying that the illustrated part of the data transmission line 50 represents in general merely a (small) part of the extent of the data transmission line 50. The apparatus 10 comprises a tapping module 20 and a current probe module 30. The tapping module 20 is connected to the data transmission line 50 at a first tapping location 61. The current probe module 30 is connected to the data transmission line 50 at a second tapping location 62. The data transmission line 50 has a first line element 51 and a second line element 52, which are preferably provided as twisted line elements 51, 52 of a copper wire pair (or copper conductor pair). Between the first tapping location 61 and the second tapping location 62 a distance is provided along the extent of the data transmission line 50, said distance being illustrated by a double-headed arrow in FIG. 1. According to the invention, the distance between the first tapping location 61 and the second tapping location 62 is preferably from approximately 2 cm to approximately 200 cm, particularly preferably from approximately 5 cm to approximately 50 cm, especially preferably from approximately 8 cm to approximately 15 cm, and with even greater preference approximately 10 cm.

Figure 2:
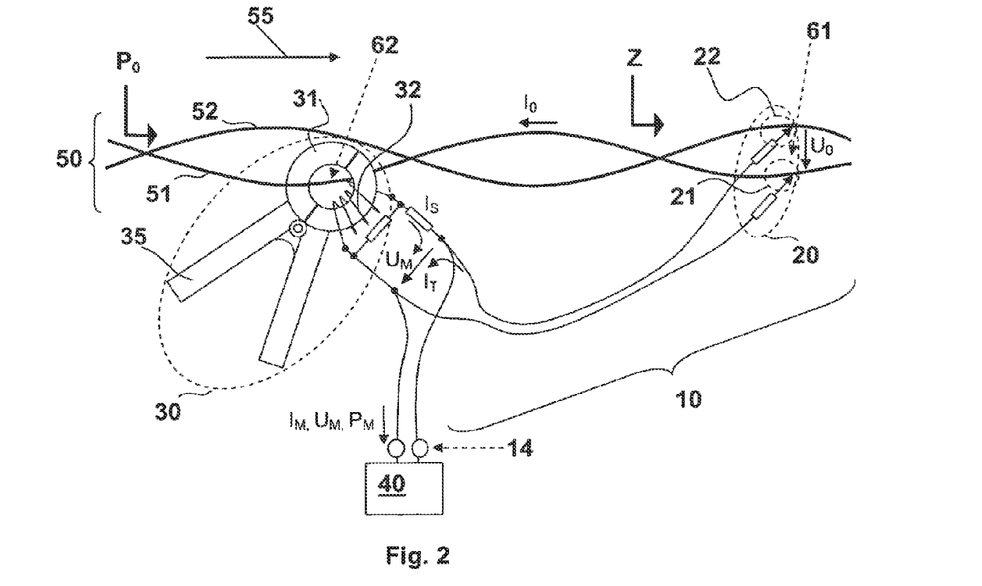
FIG. 2 shows a schematic illustration of the apparatus according to the invention for decoupling the radio-frequency signal with greater detailing by comparison with FIG. 1.
Figure 4:
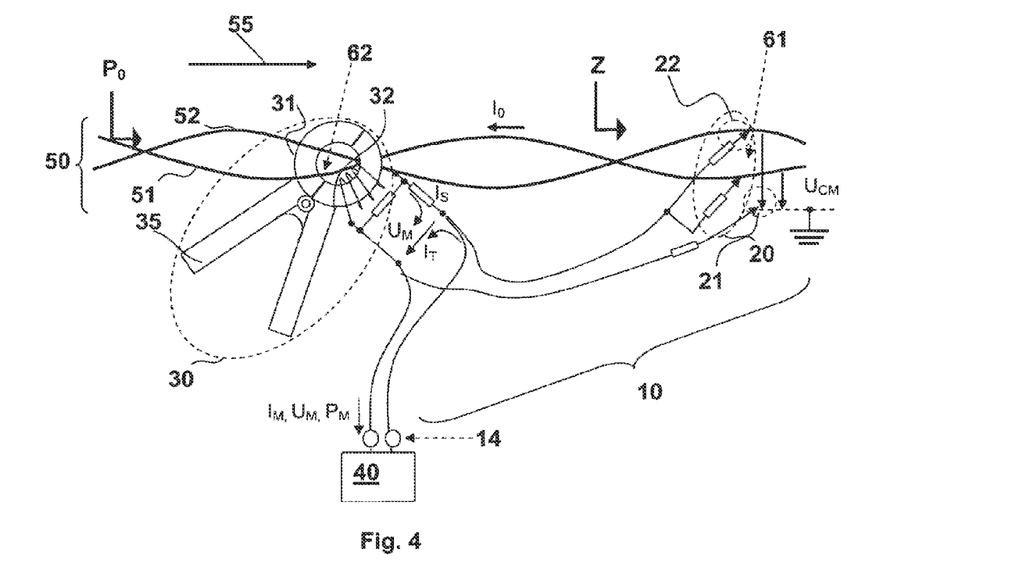
FIG. 4 shows a schematic illustration of the apparatus according to the invention for decoupling the interference voltages with greater detailing by comparison with FIG. 1.

FIG. 2 illustrates the operation of the apparatus 10 according to the invention for decoupling the radio-frequency signal (i.e. differential-mode operation), while FIG. 4 illustrates the operation of the apparatus 10 according to the invention for decoupling interference signals or interference voltages (i.e. common-mode operation).

FIG. 2 represents a schematic illustration of the apparatus 10 according to the invention for decoupling the radio-frequency signal with greater detailing by comparison with FIG. 1. The apparatus 10 with its tapping module 20 and its current probe module 30 is once again illustrated. The illustrated part of the data transmission line 50 once again corresponds merely to a (small) part of the extent of the data transmission line 50. The tapping module 20 preferably has a first tapping element 21, and a second tapping element 22. By means of the tapping elements 21 and 22 it is possible to realize an electrically conductive connection (in the sense of measuring electrodes) to the line elements 51, 52 at the first tapping location 61. The current probe module 30 preferably has a toroidal core magnet 31, by means of which (via the measurement of the magnetic flux), the current flow through one of the line elements 51, 52 of the data transmission line 50 can be measured. At the second tapping location 62, the toroidal core magnet 31 of the current probe module 30 surrounds one of the line elements 51, 52.

In the connection example illustrated, the current probe module 30 is coupled to the first line element 51 or with the first line element 51 (at the second tapping location 62) and the first tapping element 21 is connected to the first line element 51 and the second tapping element 22 is connected to the second line element 52 (at the first tapping location 61). The apparatus 10 according to the invention comprises an output 14, to which a spectrum analyzer 40 can preferably be connected, particularly if the power spectral density of the radio-frequency signal transmitted on the data transmission line 50 is intended to be measured.

An accurate determination of the power spectral density is required particularly when a plurality of data transmission lines potentially interacting with one another (for instance as a result of crosstalk) from different providers are utilized and it is necessary to ensure legally unequivocally that the coupling-in of signals (in particular into one or more of such data transmission lines by one of the providers) accords with the (statutory or regulatory) technical stipulations. This requires a high accuracy when determining the power spectral density, in particular.

In FIG. 2 the radio-frequency signal propagates in accordance with the propagation direction 55 (i.e. from left to right in the figure). In this case, the first line element 51 corresponds to the a-conductor of the data transmission line 50. The second line element 52 corresponds to the b-conductor of the data transmission line 50. By way of example, the power $P_0$ (or power spectral density) coupled into the data transmission line 50 (by a signal providing device not illustrated) is to be measured. The current $I_0$ flowing in the first line element 51 is measured by means of the current probe module 30. For this purpose, the current probe module 30 preferably has a secondary winding 32 around the cross section of the toroidal core magnet 31, the current $I_S$ (current probe module current) being generated by means of said secondary winding or the current IS being induced in said secondary winding. The voltage $U_0$ between the line elements 51, 52 is tapped off by means of the tapping module 20, said voltage causing a current $I_T$ (tapping module current) in the apparatus 10. On account of the directional coupler function of the apparatus 10 according to the invention, the radio-frequency signal (transmission signal) coming from the left is coupled to the output 14 of the apparatus 10, wherein $I_S$ and $I_T$ mutually amplify one another (constructive interference). A radio-frequency signal coming from the right is largely suppressed (destructive interference of $I_S$ and $I_T$). If the tapping elements 21, 22 are interchanged, this situation is reversed.

The data transmission line 50 has an impedance of Z. At the output 14 of the apparatus 10, the measurement voltage $U_M$, the measurement current $I_M$ and the power $P_M$ are present for further processing by the spectrum analyzer 40. In this case, the measurement current $I_M$ corresponds to the (complex addition) of $I_S$ and $I_T$. According to the invention, it is preferred for the apparatus 10 to comprise a changeover switch 11 (cf. FIG. 3), wherein the changeover switch 11 effects a circuitry interchange of the tapping elements 21, 22 of the tapping module 20. This means that in the case of connection of the first tapping element 21 to the first line element 51 and in the case of connection of the second tapping element 22 to the second line element 52, a switch-over of the changeover switch 11 brings about a connection configuration of the apparatus 10 to the line elements 51, 52 of the data transmission line 50 in such a manner as if the first tapping element 21 were connected to the second line element 52 and the second tapping element 22 were connected to the first element 51. The sign of $U_0$ and thus of $I_T$ can thereby be switched over. In the case of an optimum matching between the tapping module 20 and the current probe module 30 (given corresponding setting of the changeover switch 11) $I_T$ and $I_S$ precisely cancel one another out (i.e. they interfere destructively). When the tapping module 20 is accurately coordinated with the current probe module 30, the apparatus 10 produces the function of a directional coupler.

In measurement operation (i.e. after a switch-over of the changeover switch 11), constructive interference arises, i.e. a superposition, and $I_M$ corresponds to the sum of $I_S$ and $I_T$.

Figure 3:
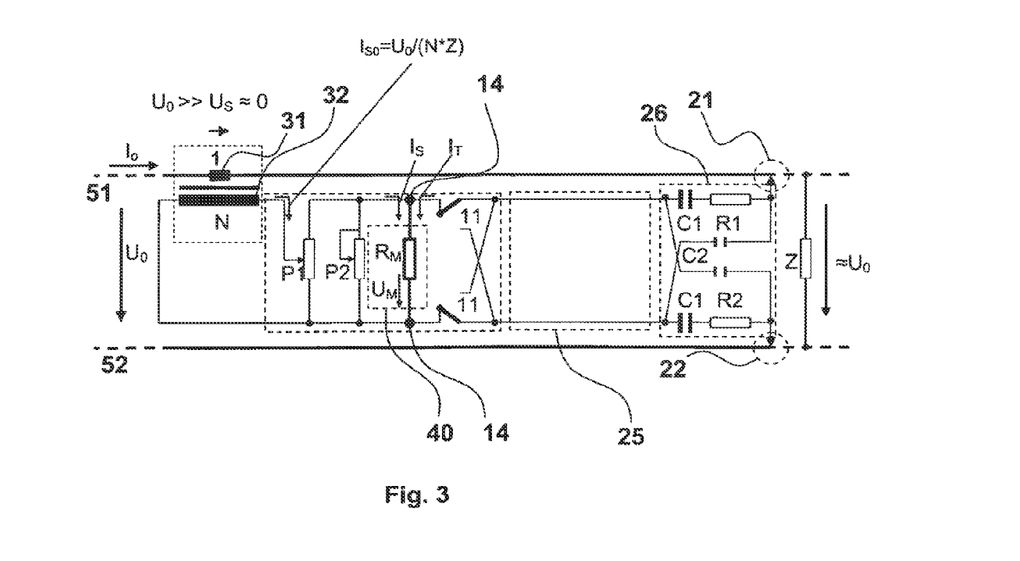
FIG. 3 schematically shows an equivalent circuit diagram of the apparatus according to the invention in the case of use in accordance with FIG. 2.

FIG. 3 schematically illustrates an equivalent circuit diagram of the apparatus 10 according to the invention in the case of the use in accordance with FIG. 2. A printed circuit board or circuit board (not separately illustrated or designated) which is integrated for example into the current probe module 30 (for example in a manner accommodated in a handle of the current probe module, said handle being used at the same time for opening and closing the toroidal magnet 31) has various circuit elements that are explained in greater detail below. The secondary winding 32 has N=15 turns, for example, such that $I_{S0}$ results as $I_{S0}=U_0/(N \times Z)$, i.e. $U_T$ corresponds to $U_0$ divided by the product of the number of turns of the secondary winding 32 (or the turns ratio of primary and secondary windings 31, 32) and the impedance Z. A potentiometer P1 (for example 500Ω) serves for exactly balancing the current probe module current $I_S$ with the tapping module current $I_T$ (which is also designated as the sensing head current). Upon reversal of the signal direction (or propagation direction of the radio-frequency signal in the data transmission line 50) or upon the switch-over of the changeover switch 11, destructive interference of current probe module current $I_S$ and tapping module current $I_T$ arises. A further potentiometer P2 (for example 5 kΩ) serves for balancing the measurement voltage $U_M$, in particular to 40 dB decoupling attenuation. The measurement voltage $U_M$ is dropped across the input resistor $R_M$ (for example 135Ω) of the spectrum analyzer 40. The changeover switch 11 is illustrated in FIG. 3 and serves for interchanging the polarity of the sensing head current $I_T$ (or of the tapping module current). A tapping module cable 25 (also called sensing head cable) has a length of 40 cm for example, and has a very high characteristic impedance in order that the current probe module current $I_S$ flows primarily via the input resistor $R_M$ of the spectrum analyzer 40. Preferably, the tapping module 20 comprises the tapping module cable 25 and a tapping module unit 26 having the components R1, C1 and C2 and test tips. The tapping module unit 26 is preferably fixedly connected to the tapping module cable 25. In this case, the capacitance C1 serves for the DC decoupling of the tapping module current $I_T$. The sensing head resistor R1 (for example in each case (i.e. twice) 9300Ω) serves for the high-resistance connection to U0 across the power impedance Z (of the data transmission line 50), which on average is 135Ω, for example. A variable capacitance C2 (for example 0 to 2 pF), by means of insulated wires twisted over a length of approximately 1 to 4 cm, brings about a possibly required phase shift for additionally balancing the phases of the two currents $I_S$ and $I_T$ (such that, with good balancing, the difference between $I_S$ and $I_T$ approximately vanishes, i.e. is approximately equal to 0). According to the invention, C2 is coordinated for example with the length of the tapping module cable 25 (for example 40 cm) and the distance between the first and second tapping locations 61, 62 (for example 10 cm). In general, C2 cannot be set to the required magnitude with the aid of a trimming capacitor, since the minimum magnitude thereof is often too high (for example 1.5 to 5.5 pF).

According to the invention, it is advantageously possible that overdriving and the occurrence of intermodulation distortions in a spectrum analyzer 40 are avoided by means of the apparatus 10 according to the invention, in particular by means of the comparatively high decoupling attenuation. This, too, serves for increasing the accuracy when carrying out measurements of the connected spectrum analyzer 40.

According to the invention, the toroidal core magnet 31 is, in particular, a hinged toroidal core magnet that can be opened by means of an actuation of tongs apparatus 35 (cf. FIG. 2) of the current probe module 30.

FIG. 4 represents a schematic illustration of the apparatus 10 according to the invention for decoupling the interference voltages. The apparatus 10 with its tapping module 20 and its current probe module 30 is once again illustrated. The illustrated part of the data transmission line 50 once again merely corresponds to a (small) part of the extent of the data transmission line 50. The tapping module 20 preferably has the first tapping element 21 and the second tapping element 22. By means of the tapping elements 21, 22 it is possible to realize an electrically conductive connection (in the sense of measuring electrodes) to, on the one hand, the ring elements 51, 52 and, on the other hand, ground of the data transmission line 50 at the first tapping location 61. The current probe module 30 preferably has a toroidal core magnet 31, by means of which (via the measurement of the magnetic flux) the current flow through both line elements 51, 52 of the data transmission line 50 can be measured, wherein the two line elements 51, 52 are enclosed in the same sense by the toroidal core magnet 31 at the second tapping location 62.

In the connection example illustrated, the first tapping element 21 is connected to ground of the data transmission line 50 and the second tapping element 22 is connected to the first and second line elements 51, 52 (at the first tapping location 61). The apparatus 10 according to the invention has an output 14, to which a spectrum analyzer 40 can preferably be connected, particularly if the interference signal on the data transmission line 50 is intended to be measured.

In FIG. 4, the interference signal or the interference voltage propagates in accordance with the propagation direction 55 (i.e. from left to right in the figure). In this case, the first line element 51 corresponds to the a-conductor of the data transmission line 50. The second line element 52 corresponds to the b-conductor of the data transmission line 50. The current $I_{CM}$ resulting from the current flows in the first and second line elements 51, 52 is measured by means of the current probe module 30. For this purpose, the current probe module 30 preferably has a secondary winding 32 around the cross section of the toroidal core magnet 31, the current $I_S$ (current probe module current) being generated by means of said secondary winding or the current $I_S$ being induced in said secondary winding. The voltage $U_{CM}$ between, on the one hand, the two line elements 51, 52 and, on the other hand, ground of the data transmission line 50 is tapped off by means of the tapping module 20, said voltage causing a current $I_T$ (tapping module current) in the apparatus 10. On account of the directional coupler function of the apparatus 10 according to the invention, the interference voltage signal coming from the left is coupled to the output 14 of the apparatus 10, wherein $I_S$ and $I_T$ mutually amplify one another (constructive interference). A radio-frequency signal coming from the right is largely suppressed (destructive interference of $I_S$ and $I_T$). If the tapping elements 21, 22 are interchanged, this situation is reversed.

The data transmission line 50 has an impedance of Z. At the output 14 of the apparatus 10, the measurement voltage $U_M$, the measurement current $I_M$ and the power $P_M$ are present for further processing by the spectrum analyzer 40. In this case, the measurement current $I_M$ corresponds to the (complex addition) of $I_S$ and $I_T$. According to the invention, it is preferred for the apparatus 10 to comprise a changeover switch 11 (cf. FIG. 5), wherein the changeover switch 11 effects a circuitry interchange of the tapping elements 21, 22 of the tapping module 20. This means that in the case of connection of the first tapping element 21 to ground of the data transmission line 50 and in the case of connection of the second tapping element 22 to the first and second line elements 51, 52, a switch-over of the changeover switch 11 brings about a connection configuration of the apparatus 10 to the line elements 51, 52 of the data transmission line 50 in such a manner as if the first tapping element 21 were connected to the first and second line elements 51, 52 and the second tapping element 22 were connected to ground of the data transmission line 50. The sign of $U_{CM}$ and thus of $I_T$ can thereby be switched over. In the case of an optimum matching between the tapping module 20 and the current probe module 30 (given corresponding setting of the changeover switch 11) $I_T$ and $I_S$ precisely cancel one another out (i.e. they interfere destructively). When the tapping module 20 is accurately coordinated with the current probe module 30, the apparatus 10 produces the function of a directional coupler.

In measurement operation (i.e. after a switch-over of the changeover switch 11), constructive interference arises, i.e. a superposition, and $I_M$ corresponds to the sum of $I_S$ and $I_T$.

Figure 5:
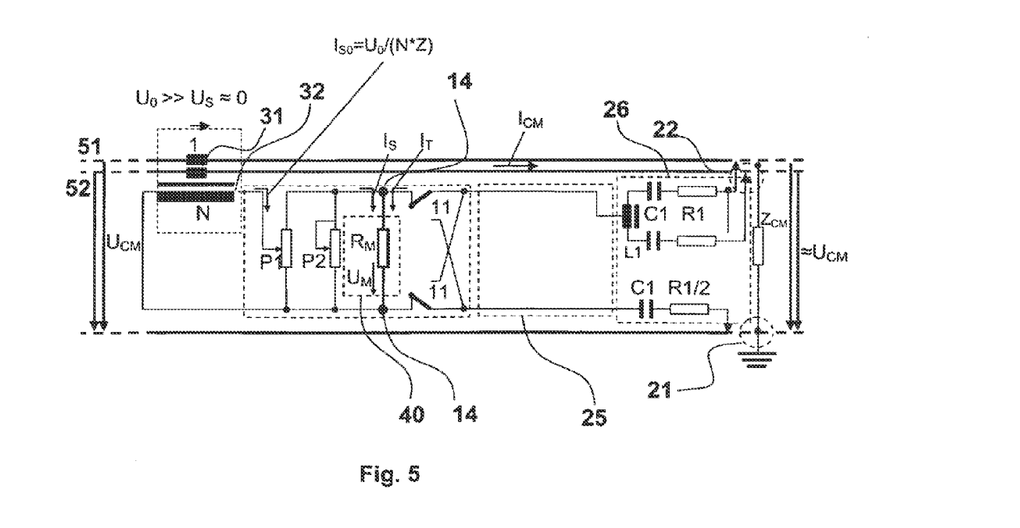
FIG. 5 schematically shows an equivalent circuit diagram of the apparatus according to the invention in the case of use in accordance with FIG. 4.

FIG. 5 schematically illustrates an equivalent circuit diagram of the apparatus 10 according to the invention in the case of the use in accordance with FIG. 4. A printed circuit board or circuit board (not separately illustrated or designated) which is integrated for example into the current probe module 30 (for example in a manner accommodated in a handle of the current probe module, said handle being used at the same time for opening and closing the toroidal magnet 31) has various circuit elements that correspond to the circuit elements in accordance with the description of FIG. 3. Only the differences are explained in greater detail below.

Preferably, the tapping module 20 comprises the tapping module cable 25 and a tapping module unit 26 having the components R1, R1/2, C1 and L1 and test tips. The tapping module unit 26 is preferably fixedly connected to the tapping module cable 25. In this case, the capacitance C1 serves for the DC decoupling of the tapping module current $I_T$. The sensing head resistor R1 (for example in each case (i.e. twice) 9300Ω) serves for the high-resistance connection to $U_{CM}$ across the line characteristic impedance $Z_{CM}$ (of the data transmission line 50), which on average is 55 to 60Ω, for example. An inductance L1 is bifilar for the common-mode current $I_{CM}$, but suppresses the flow of the differential current fundamentally present between the first line element 51 and the second line element 52. L1 is additionally connected in series with the two resistors R1. The resistor R1/2 corresponds, for example, to a value of 4650Ω.

According to the invention, the toroidal core magnet 31 is, in particular, a hinged toroidal core magnet that can be opened by means of an actuation of tongs apparatus 35 (cf. FIG. 2) of the current probe module 30.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An apparatus for decoupling a radio-frequency signal transmitted on a data transmission line having a first line element and a second line element, or for decoupling interference voltages, the apparatus comprising:
   a tapping module, connected to the first and second line elements at a first tapping location of the data transmission line, for decoupling the radio-frequency signal or interference voltages;
   a current probe module, coupled to the first line element at a second tapping location of the data transmission line; and
   an output terminal connected to a device, wherein the output terminal exhibits an output impedance;
   wherein the apparatus is capable of matching the magnitude of output impedance to an input impedance exhibited by the device;
   wherein the tapping module is a sensing head having a first tapping element and a second tapping element; and
   wherein the apparatus further comprises a changeover switch configured to effect a circuitry interchange of the tapping elements of the tapping module.

2. The apparatus of claim 1, wherein the current probe module is further coupled to the second line element at the second tapping location.

3. The apparatus of claim 1, wherein the current probe module comprises a split toroidal core magnet.

4. The apparatus of claim 2, wherein the coupling of the current probe module to the first and second line elements is provided such that the current probe module embraces the first and second line elements in the same sense.

5. The apparatus of claim 1, wherein the first and second tapping locations are at a distance from one another of 2 cm to 200 cm.

6. The apparatus of claim 1, wherein the first and second tapping locations are at a distance from one another of 5 cm to 50 cm.

7. The apparatus of claim 1, wherein the first and second tapping locations are at a distance from one another of 8 cm to 15 cm.

8. The apparatus of claim 1, wherein the first and second tapping locations are at a distance from one another of 10 cm.

9. The apparatus of claim 1, wherein the apparatus has a decoupling attenuation of 40 dB+/−0.1 dB from 30 kHz to 30 MHz.

10. A method for carrying out a measurement on a data transmission line provided for transmitting a radio-frequency signal and having a first line element and a second line element, the method comprising:
- connecting a tapping module at a first tapping location of the data transmission line;
- coupling a current probe module at a second tapping location of the data transmission line;
- decoupling the radio-frequency signal; and
- providing an output terminal connectable to a device, wherein the output terminal exhibits an output impedance and the output terminal is capable of matching the magnitude of output impedance to an input impedance exhibited by the device;

wherein the method further comprises:
- measuring, by a spectrum analyzer, a power spectral density of the radio-frequency signal.

11. The method of claim 10, wherein the data transmission line is a copper wire pair.

12. The method of claim 10, wherein the data transmission line is a copper wire twisted pair.

13. The method of claim 10, wherein the device is the spectrum analyzer.

14. The method of claim 10, wherein the data transmission line can be used uninterruptedly for the data transmission while a measurement is carried out.

15. An apparatus for decoupling a radio-frequency signal transmitted on a data transmission line having a first line element and a second line element, or for decoupling interference voltages, the apparatus comprising:
- a tapping module, connected to the first and second line elements at a first tapping location of the data transmission line, for decoupling the radio-frequency signal or interference voltages;
- a current probe module, coupled to the first line element at a second tapping location of the data transmission line; and
- an output terminal connected to a device, wherein the output terminal exhibits an output impedance;
- wherein the apparatus is capable of matching the magnitude of output impedance to an input impedance exhibited by the device;
- wherein the apparatus has a decoupling attenuation of 40 dB+/−0.1 dB from 30 kHz to 30 MHz.

* * * * *